(12) United States Patent
Kim

(10) Patent No.: US 8,678,154 B2
(45) Date of Patent: Mar. 25, 2014

(54) APPARATUS FOR ADJUSTING HEIGHT OF VEHICLE SEAT

(75) Inventor: Jae-Ho Kim, Yeongcheon-si (KR)

(73) Assignee: DAS Corporation, Gyeongju-si, Gyeongdangbuk-do (KR)

( * ) Notice: Subject to any disclaimer, the term of this patent is extended or adjusted under 35 U.S.C. 154(b) by 500 days.

(21) Appl. No.: 12/975,297

(22) Filed: Dec. 21, 2010

(65) Prior Publication Data
US 2011/0266851 A1 Nov. 3, 2011

(30) Foreign Application Priority Data

May 3, 2010 (KR) .................. 10-2010-0041580
Jul. 27, 2010 (KR) .................. 10-2010-0071939

(51) Int. Cl.
*B60N 2/10* (2006.01)
*F16D 41/066* (2006.01)

(52) U.S. Cl.
USPC ........ 192/38; 192/45.004; 192/44; 192/223.2

(58) Field of Classification Search
USPC ............. 192/15, 19, 12 B, 223.2, 44, 45.001, 192/45.004, 38; 74/374
See application file for complete search history.

(56) References Cited

U.S. PATENT DOCUMENTS 6,481,557 B2 * 11/2002 Denis ................... 192/223.2
2004/0112701 A1 * 6/2004 Baker et al. .............. 192/44

* cited by examiner

*Primary Examiner* — David D Le
*Assistant Examiner* — Ryan Dodd
(74) *Attorney, Agent, or Firm* — Blakely, Sokoloff, Taylor & Zafman LLP

(57) ABSTRACT

An apparatus for adjusting the height of a vehicle seat. The apparatus includes an input shaft for inputting a torque by using a lever installed at one side of the seat; an output member connected to a link means to output the torque for adjusting the height of the seat; a clutch drum interposed between the input shaft and the output member on a torque transfer path; a torque transfer unit comprising a plurality of neighboring engagers wherein the engagers disposed at two ends of the torque transfer unit are spaced apart from each other, and wedge-combined between the input shaft and the clutch drum to transfer the torque; and an elastic member for providing an elastic restoration force for moving the torque transfer unit to its initial position. According to the present invention, since a conventional retainer may be omitted, backlash caused by a retaining clearance and an operation clearance may be prevented and thus an operational efficiency may be increased. Also, an inversely input torque applied to an output member may be weakened and thus conventional problems of a reduction in operational efficiency and generation of noise may be solved.

11 Claims, 8 Drawing Sheets

APPARATUS FOR ADJUSTING HEIGHT OF VEHICLE SEAT

CROSS-REFERENCE TO RELATED PATENT APPLICATION

This application claims the benefit of Korean Patent Application No. 10-2010-0071939, filed on Jul. 27, 2010 and, Korean Patent Application No. 10-2010-0041580, filed on May 3, 2010 in the Korean Intellectual Property Office, the disclosure of which is incorporated herein in its entirety by reference.

BACKGROUND OF THE INVENTION

1. Field of the Invention

The present invention relates to an apparatus for adjusting the height of a vehicle seat, and more particularly, to an apparatus for adjusting the height of a vehicle seat, in which a conventional retainer for retaining engagers is omitted such that the number of components is reduced to reduce a manufacturing cost and that an operation clearance and a retaining clearance are removed to increase an operational efficiency.

2. Description of the Related Art

In general, vehicle seats such as driver and passenger seats provide various functions for people's convenience.

For example, the functions include a sliding function for sliding a seat forward or backward according to a body type of a user, an elevating function for elevating a seat upward or downward, and a reclining function for adjusting an inclination of a backrest.

In addition, vehicles those are currently released or above a certain level include an apparatus for providing a seat elevating function to adjust the height of a seat.

The seat height adjusting apparatus is manipulated by using a lever installed at one side of a seat, and adjusts the height of the seat by transferring external power to a link means of a seat cushion.

The seat height adjusting apparatus mainly includes a clutch unit and a brake unit, the clutch unit transfers an external input to a link means of a seat cushion, and the brake unit blocks inversely input power to fix the link means in a completely operated state.

Meanwhile, referring to FIG. 8, a conventional seat height adjusting apparatus essentially includes a retainer for retaining engagers 8 for power transfer. Due to the retainer, an operation clearance is generated between cam surfaces and the engagers 8, and a retaining clearance is generated between the engagers 8 and the retainer. As such, in the conventional seat height adjusting apparatus, backlash occurs due to the operation clearance and the retaining clearance and thus an operational efficiency is reduced.

Also, a process of combining the engagers 8 with the retainer is additionally required and thus a manufacturing cost is increased.

SUMMARY OF THE INVENTION

The present invention provides an apparatus for adjusting the height of a vehicle seat, capable of preventing a reduction in operational efficiency due to backlash by removing a retainer for retaining engagers for power transfer to remove a retaining clearance formed between the engagers and the retainer.

The present invention also provides an apparatus for adjusting the height of a vehicle seat, in which a retainer for retaining engagers for power transfer is omitted such that the number of components is reduced to reduce a manufacturing cost and an assembling process is omitted to reduce a manufacturing time.

According to an aspect of the present invention, there is provided an apparatus for adjusting a height of a vehicle seat, the apparatus including an input shaft for inputting a torque by using a lever installed at one side of the seat; an output member connected to a link means to output the torque for adjusting the height of the seat; a clutch drum interposed between the input shaft and the output member on a torque transfer path; a torque transfer unit including a plurality of neighboring engagers wherein the engagers disposed at two ends of the torque transfer unit are spaced apart from each other, and wedge-combined between the input shaft and the clutch drum to transfer the torque; and an elastic member for providing an elastic restoration force for moving the torque transfer unit to its initial position.

The clutch drum and the input shaft may rotate about the same central axis, a plurality of cam surfaces may be formed in a concave-curved or flat shape on at least one of an outer circumferential surface of the input shaft and an inner circumferential surface of the clutch drum, and the torque transfer unit may be wedge-combined between the outer circumferential surface of the input shaft and the inner circumferential surface of the clutch drum to transfer the torque of the input shaft to the clutch drum.

The elastic member may include a pair of bent portions extending and bent from two ends of the elastic member, and contacting and supported by the engagers disposed at the two ends of the torque transfer unit.

The apparatus may further include a spring stopper member including an inner circumferential surface into and by which the elastic member is inserted and supported, and the bent portions of the elastic member may be inserted into and motion-restricted by a guide hole formed in the inner circumferential surface of the spring stopper member.

If the torque transfer unit moves in one circumferential direction in association with rotation of the input shaft, one of the bent portions may be pushed by the engager disposed at one end of the torque transfer unit to move in the same direction as the torque transfer unit, and the other of the bent portions may be restrained by the guide hole and thus may not move.

The apparatus may further include a lever bracket to and with which one end of the input shaft is fixed and combined, and which includes a stop leg protruding and extending in a shaft direction; and a clutch spring for elastically supporting the stop leg to provide an elastic restoration force for restoring the lever bracket into its initial position, and accommodated in the inner circumferential surface of the spring stopper member.

The apparatus may further include a front housing including an internal space; and a guide slot formed in an outer circumference of the front housing to restrict a rotation angle of the lever bracket such that the stop leg of the lever bracket passes through the guide slot.

The apparatus may further include a spring washer inserted between a front surface of the output member and the torque transfer unit to elastically support the torque transfer unit and to provide a friction force to the output member.

The spring washer may be bent in a shaft direction to elastically support the output member.

The apparatus may further include a spring washer inserted between a rear surface of the output member and a rear cover to provide a friction force to the output member.

The apparatus may further include a plurality of protrusion legs protruding and extending from an outer circumferential surface of the clutch drum in a shaft direction to transfer the torque transferred from input shaft to the output member.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining embodiments of the invention with reference to the attached drawings.

Figure 1:
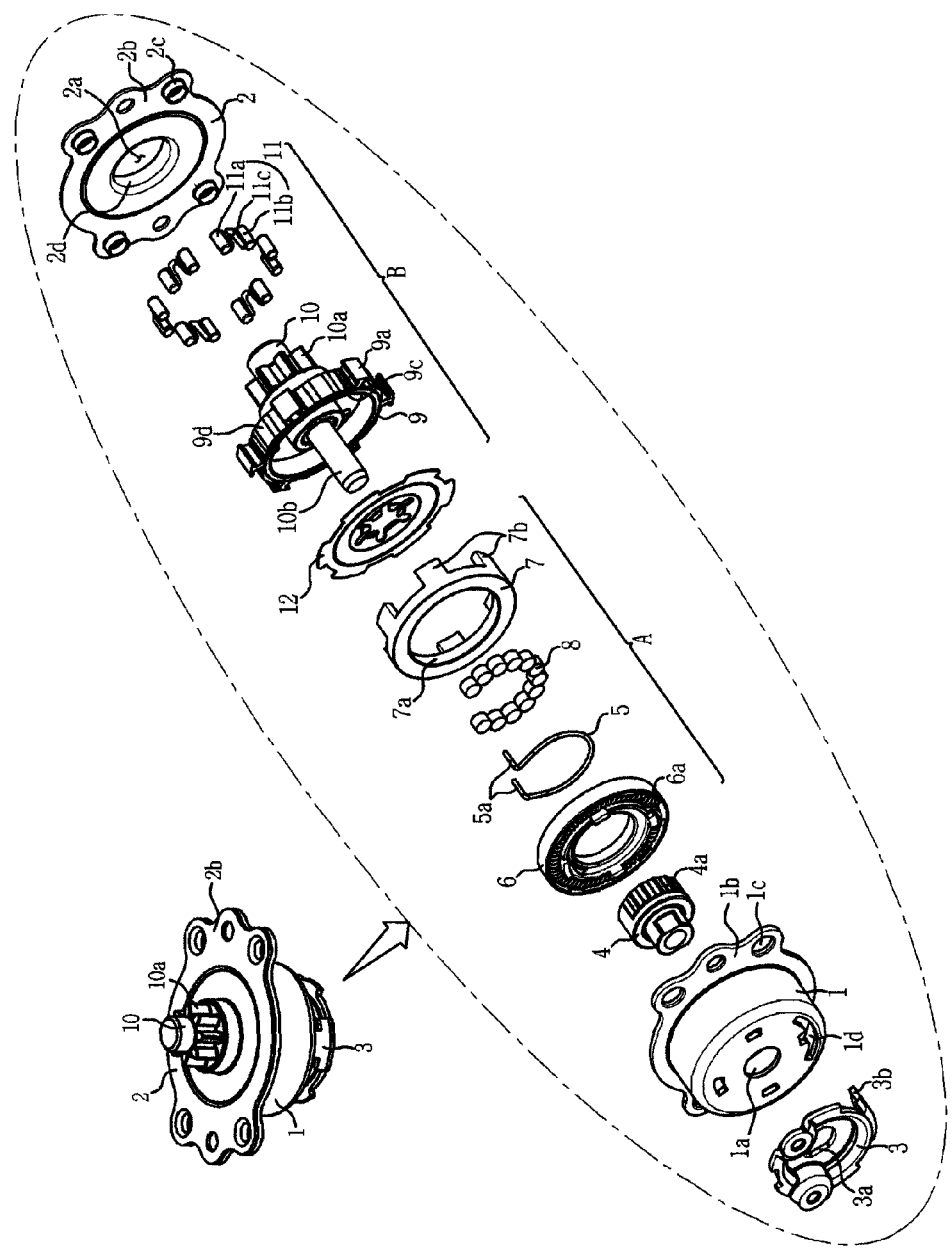
FIGS. 1 and 2 are exploded perspective views of an apparatus for adjusting the height of a vehicle seat, according to an embodiment of the present invention.
Figure 2:
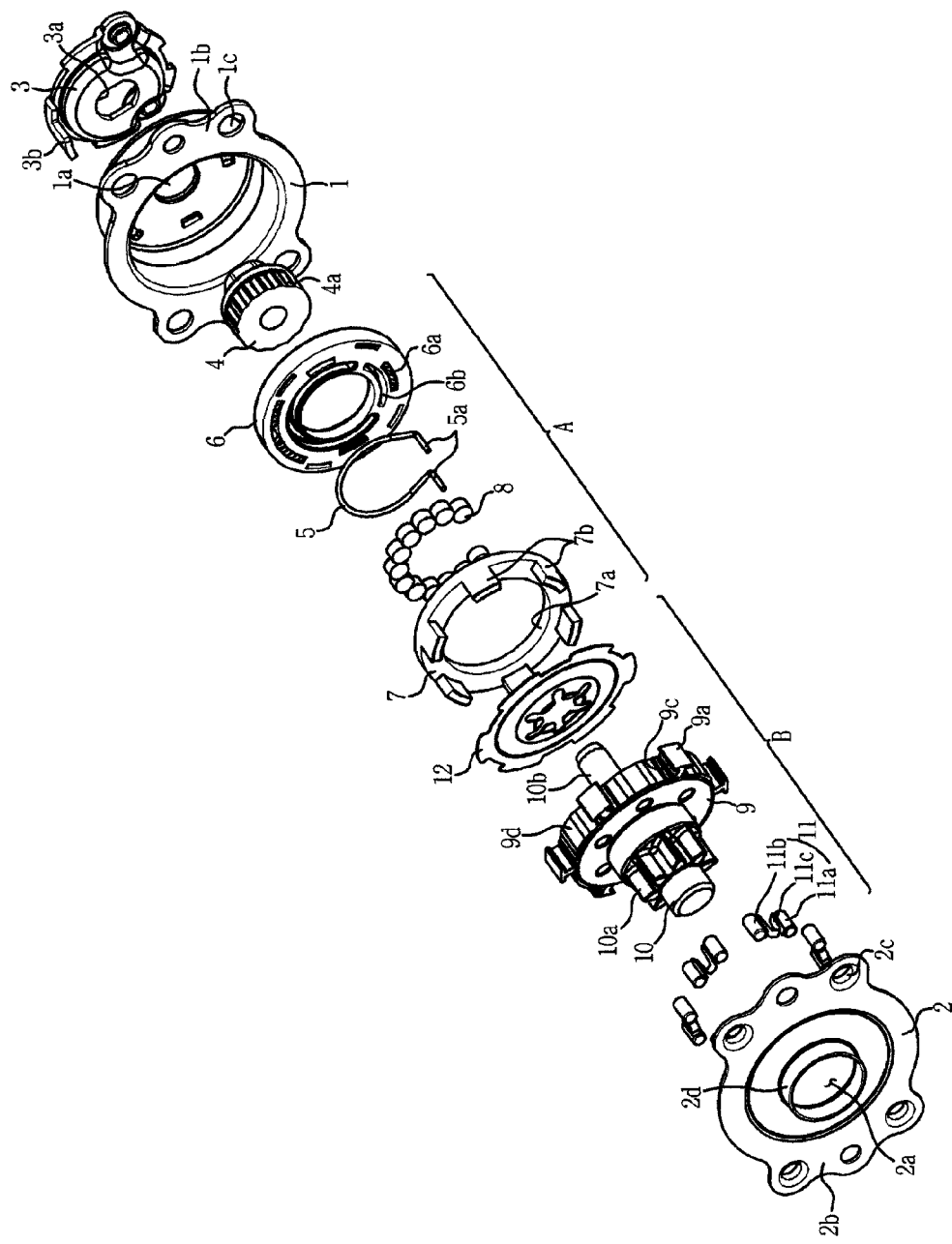
Figure 3:
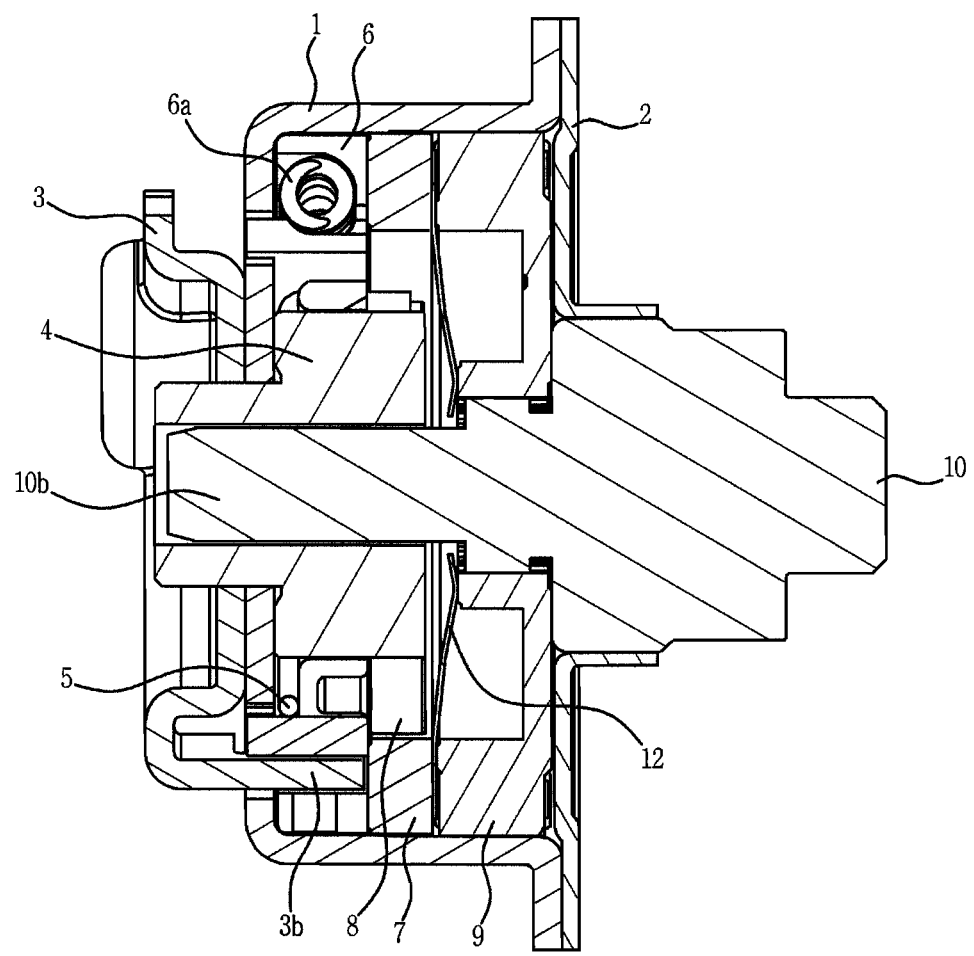
FIG. 3 is a combined side cross-sectional view of the seat height adjusting apparatus illustrated in FIGS. 1 and 2, according to an embodiment of the present invention.
Figure 4:
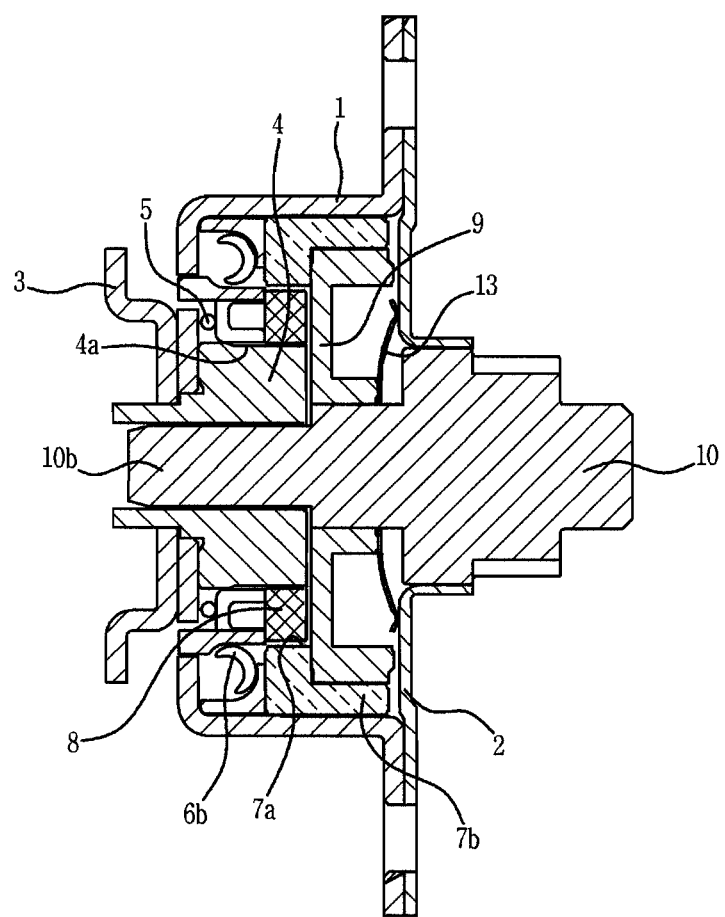
FIG. 4 is a combined side cross-sectional view of the seat height adjusting apparatus illustrated in FIGS. 1 and 2, according to another embodiment of the present invention.
Figure 5:
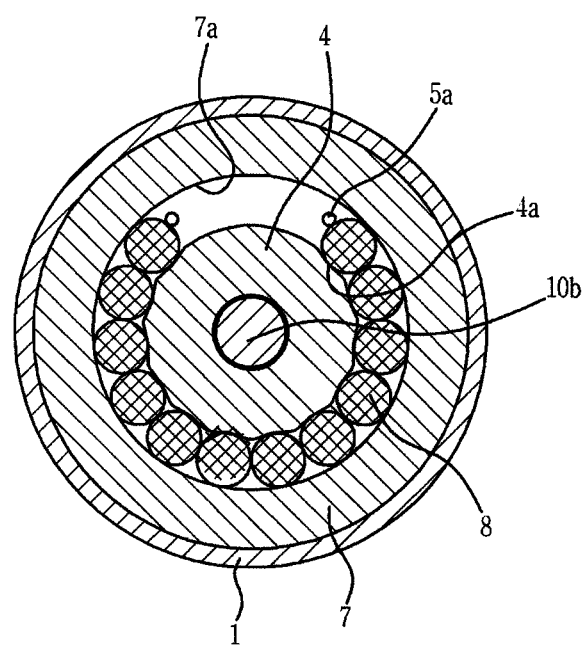
FIG. 5 is a cross-sectional view of a clutch unit illustrated in FIGS. 1 and 2.
Figure 6A:
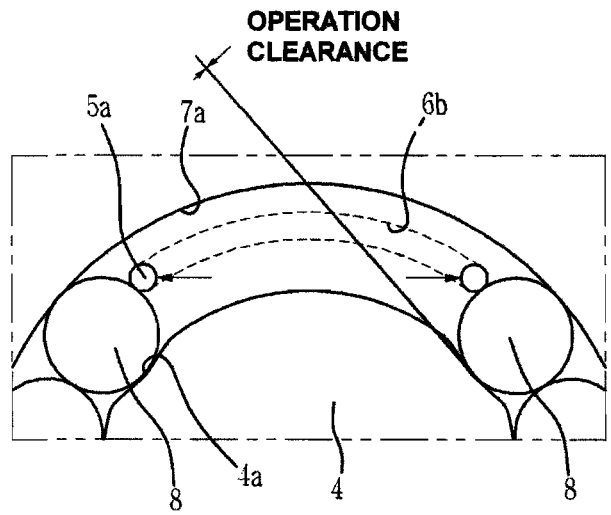
FIGS. 6A through 6C are schematic views showing an operation state of the clutch unit illustrated in FIGS. 1 and 2.
Figure 6B:
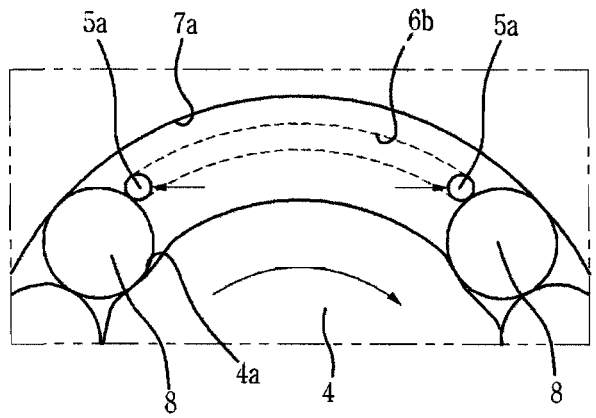
Figure 6C:
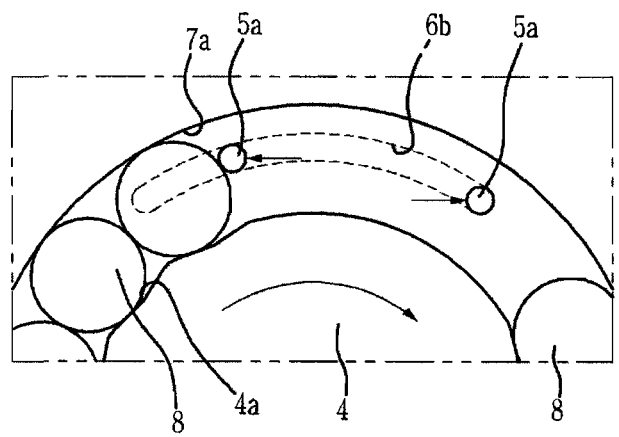
Figure 7:
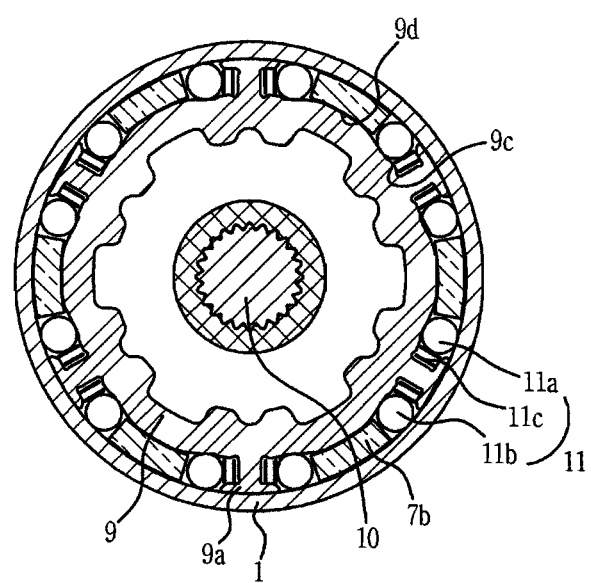
FIG. 7 is a cross-sectional view of a brake unit illustrated in FIGS. 1 and 2.
Figure 8:
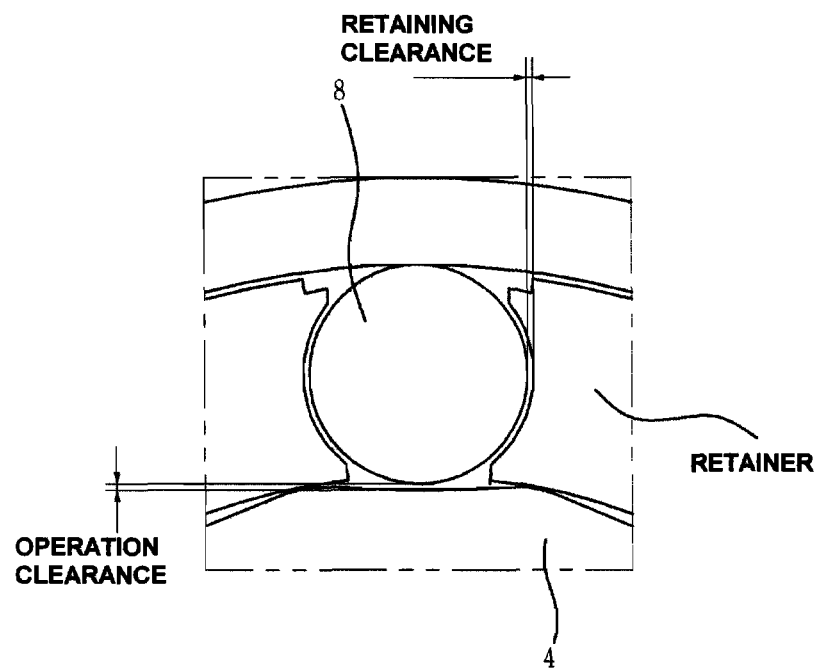
FIG. 8 is a schematic view showing an operation state of a conventional apparatus for adjusting the height of a vehicle seat.

FIGS. 1 and 2 are exploded perspective views of an apparatus for adjusting the height of a vehicle seat, according to an embodiment of the present invention. FIG. 3 is a combined side cross-sectional view of the seat height adjusting apparatus illustrated in FIGS. 1 and 2, according to an embodiment of the present invention. FIG. 4 is a combined side cross-sectional view of the seat height adjusting apparatus illustrated in FIGS. 1 and 2, according to another embodiment of the present invention. FIG. 5 is a cross-sectional view of a clutch unit A illustrated in FIGS. 1 and 2. FIGS. 6A through 6C are schematic views showing an operation state of the clutch unit A illustrated in FIGS. 1 and 2. FIG. 7 is a cross-sectional view of a brake unit B illustrated in FIGS. 1 and 2.

Referring to FIGS. 1 through 3, the seat height adjusting apparatus includes a front housing 1 including an internal space, a rear cover 2 combined with a rear surface of the front housing 1, the clutch unit A for releasing a brake force by forming on the same axis as a shaft center a path of transferring power using a friction force caused by a rotation torque of a handle lever (not shown), and the brake unit B rotated by using the clutch unit A while the brake force is released, and for adjusting the height of a seat by forcibly rotating a sector gear of a link means.

Meanwhile, in the present invention, the handle lever operates by using an up/down method, and counterclockwise rotation is achieved when the handle lever is up and clockwise rotation is achieved when the handle lever is down.

The front housing 1 includes a cylindrical body combined with the rear cover 2 to form the internal space, and the cylindrical body includes a shaft hole 1a, side flanges 1b, coupling holes 1c, and a guide slot 1d are formed in the body.

That is, in the front housing 1, the shaft hole 1a is formed at the center of a front surface of the front housing 1, the side flanges 1b are formed at two sides of the front housing 1, the coupling holes 1c are formed in the side flanges 1b, and the guide slot 1d is formed in the front surface partially along an outer circumference that is concentric to the shaft hole 1a.

Here, the guide slot 1d is a space through which a stop leg 3b of a lever bracket 3 for inputting power into an input shaft 4 to elevate a seat passes, and the stop leg 3b restricts rotation range of the handle lever by using the guide slot 1d.

The rear cover 2 is combined with the open rear surface of the front housing 1. In the rear cover 2, a shaft hole 2a is formed at the center of a front surface of the rear cover 2, side flanges 2b are formed at two sides of the rear cover 2, fixing pins 2c to be inserted into the coupling holes 1c of the front housing 1 are formed in the side flanges 2b, and a fixing boss 2d extends outward from the shaft hole 2a such that an output gear 10a of an output shaft 10 penetrates therethrough.

Since through holes are formed in the side flanges 1b, 2b, the front housing 1 and the rear cover 2 are coupled to each other by using a coupling means through the through holes.

In the front housing 1 and the rear cover 2, the shaft holes 1a and 2a are formed at the shaft center to dispose the clutch unit A and the brake unit B on a line of the shaft center.

The structure of the clutch unit A will now be described.

The clutch unit A includes the input shaft 4 to be inserted into the front housing 1 and having one end fixed to and combined with the lever bracket 3, a clutch spring 6a for elastically supporting the stop leg 3b of the lever bracket 3, a spring stopper member 6 including a clutch spring 6a on its inner circumferential surface, a torque transfer unit 8 including a plurality of engagers to be wedge-combined with an outer circumferential surface of the input shaft 4, an elastic member 5 for providing an elastic restoration force for restoring the torque transfer unit 8 to an initial state, and a clutch drum 7 friction-contacting the torque transfer unit 8 and rotating in association with the rotation of the input shaft 4.

In the lever bracket 3, a front surface of the lever bracket 3 is connected to the handle lever for adjusting the height of a seat, a shaft hole 3a to be combined with the input shaft 4 is formed at a central portion of the lever bracket 3, and the stop leg 3b that passes through the guide slot 1d of the front housing 1 and extends to the position of the clutch spring 6a in the spring stopper member 6 is formed in a rear surface of the lever bracket 3.

In the input shaft 4, a front end of the input shaft 4 penetrates through the shaft hole 1a of the front housing 1 and is inserted and fixed into the shaft hole 3a of the lever bracket 3, a rear end of the input shaft 4 is disposed in the internal space of the front housing 1, and a insert hole into which a front end of the output shaft 10 is formed in a central portion of the input shaft 4. In this case, a plurality of cam surfaces 4a to be wedge-combined with engagers of the torque transfer unit 8 are radially formed in a concave-curved or flat shape on the outer circumferential surface of the rear end of the input shaft 4.

In the spring stopper member 6, a shaft hole through which the rear end of the input shaft 4 penetrates is formed in a central portion of the spring stopper member 6, and a ring-shaped groove for accommodating the clutch spring 6a is formed in the inner circumferential surface of the spring stopper member 6.

In this case, the clutch spring 6a is compressed in a rotation direction by the stop leg 3b of the lever bracket 3 that rotates in one direction, and provides a restoration force for restoring the lever bracket 3 to its original position when a rotation torque disappears.

That is, if the lever bracket 3 is rotated by using the handle lever, the clutch spring 6a is compressed in a rotation direction by the stop leg 3b of the lever bracket 3. After that, if a rotation torque applied to the lever bracket 3 is released, the lever bracket 3 inversely rotates to return to its initial position by an elastic restoration force of the compressed clutch spring 6a. In this case, the input shaft 4 having one end fixed to the lever bracket 3 also inversely rotates to return to its initial position.

The torque transfer unit 8 transfers a rotation torque of the input shaft 4 to the clutch drum 7, and includes a plurality of neighboring engagers formed in a circular arc. That is, a plurality of engagers are adjacent to each other in a circular arc and two end engagers are spaced apart from each other and are not adjacent to each other.

Also, the engagers of the torque transfer unit 8 are disposed on the cam surfaces 4a. In this case, the cam surfaces 4a and the engagers may correspond one to one. The torque transfer unit 8 is restrained between the cam surfaces 4a and an inner circumferential surface of the clutch drum 7 so as to move together with the cam surfaces 4a when the input shaft 4 rotates. The engagers of the torque transfer unit 8 may be formed in various shapes such as a ball shape. Also, the cam surfaces 4a may be formed on the inner circumferential surface of the clutch drum 7.

Meanwhile, the elastic member 5 provides an elastic restoration force for moving the rotated torque transfer unit 8 to its initial position, is formed in a circular arc similar to the shape of the torque transfer unit 8, and includes a pair of bent portions 5a bent toward an output member 9 at two ends of the elastic member 5. Here, the elastic member 5 is inserted into and supported by the inner circumferential surface of the spring stopper member 6, and the bent portions 5a pass through the spring stopper member 6 to elastically support two open ends of the torque transfer unit 8. That is, the bent portions 5a of the elastic member 5 contact and are supported by the engagers disposed at the two ends of the torque transfer unit 8.

The bent portions 5a are inserted into the guide hole 6b formed in a circular arc in the inner circumferential surface of the spring stopper member 6 and thus are motion-restricted. That is, the bent portions 5a may move only within the guide hole 6b.

Accordingly, as illustrated in FIG. 6, if the torque transfer unit 8 moves in one circumferential direction in association with the rotation of the input shaft 4, one of the bent portions 5a is pushed by the engager disposed at one end of the torque transfer unit 8 and thus moves in the same direction as the torque transfer unit 8. However, the other of the bent portions 5a is restrained by the guide hole 6b and thus does not move.

As such, the distance between the bent portions 5a is reduced while the torque transfer unit 8 moves in a circumferential direction, such that the elastic member 5 generates an elastic restoration force for moving the torque transfer unit 8 to its initial position. Accordingly, if a rotation torque applied to the torque transfer unit 8 is removed, due to the elastic restoration force of the elastic member 5, the bent portions 5a that move in association with the torque transfer unit 8 push the torque transfer unit 8 oppositely such that the torque transfer unit 8 may move to its initial position.

As described above, since the torque transfer unit 8 friction-contacts between the cam surfaces 4a of the input shaft 4 and a pressing surface 7a of the clutch drum 7, and is elastically supported by the bent portions 5a of the elastic member 5, a conventional retainer is not necessary. Accordingly, a retaining clearance generated due to the conventional retainer is not formed, an operation clearance between the cam surfaces 4a and the engagers may be minimized, and thus an operational efficiency may be increased.

Meanwhile, the rear end of the input shaft 4, on which the cam surfaces 4a are formed, is disposed at a central portion of the clutch drum 7, and the pressing surface 7a friction-contacting the torque transfer unit 8 is formed on the inner circumferential surface of the central portion of the clutch drum 7. That is, the engagers of the torque transfer unit 8 contact and are wedge-combined between the cam surfaces 4a formed on the outer circumferential surface of the input shaft 4, and the pressing surface 7a of the clutch drum 7.

Accordingly, when the input shaft 4 rotates, the engagers of the torque transfer unit 8 friction-contact the cam surfaces 4a of the input shaft 4 and the pressing surface 7a of the clutch drum 7 and thus the rotation torque of the input shaft 4 may be transferred to the clutch drum 7 via the engagers of the torque transfer unit 8.

Also, a shaft hole is formed in the central portion of the clutch drum 7 and a plurality of protrusion legs 7b protruding in the shaft direction are formed on an outer circumferential surface of the clutch drum 7. The protrusion legs 7b are inserted between a plurality of wedge bosses 9a protruding from an outer circumferential surface of the output member 9, and thus a rotation torque of the clutch drum 7 may be transferred to the output member 9.

Meanwhile, conventionally, if the input shaft 4 is rotated to unlock the brake unit B, due to an inversely input torque, the output shaft 10 oppositely rotates and thus the brake unit B is re-locked. If the above situation is repeated, an operational efficiency may be reduced and noise may be generated.

In order to solve these problems, as illustrated in FIG. 3, the seat height adjusting apparatus may further include a spring washer 12 inserted between a front surface of the output member 9 and the torque transfer unit 8 to elastically support the torque transfer unit 8 and the output member 9 and to provide a friction force to the output member 9. The spring washer 12 may be bent backward from its central portion to be elastically convex, and the front surface of the output member 9 may be concave such that the convex central portion of the spring washer 12 is inserted thereinto.

Accordingly, since the spring washer 12 elastically supports the torque transfer unit 8 forward, friction-contact between the torque transfer unit 8 and the pressing surface 7a of the clutch drum 7 is achieved better. Also, since the spring washer 12 elastically supports the output member 9 backward, an inversely input torque applied to the output member 9 may be weakened to prevent the above conventional problems of a reduction in operational efficiency and generation of noise.

In addition, as illustrated in FIG. 4, the seat height adjusting apparatus may further include a spring washer 13 inserted between a rear surface of the output member 9 and the rear cover 2 to provide a friction force to the output member 9. The spring washer 13 includes a shaft hole formed in its central portion such that the output shaft 10 passes therethrough, and is bent forward to be elastically convex. The rear surface of the output member 9 may be concave such that the convex central portion of the spring washer 13 is inserted thereinto. Accordingly, since the spring washer 13 elastically supports the output member 9 forward, an inversely input torque applied to the output member 9 may be weakened to prevent the above conventional problems of a reduction in operational efficiency and generation of noise.

The structure of the brake unit B will now be described. The brake unit B may be variously modified from the following descriptions.

As illustrated in FIGS. 1 through 3, the brake unit B includes the output member 9 on which the wedge bosses 9a protrude from an outer circumferential surface of a body of the output member 9, the output shaft 10 including an output gear 10a combined with the output member 9 and passing through the shaft hole 2a of the rear cover 2 to engage with the sector gear of the link means, and an engager member 11 disposed at a side of the output member 9 and generating a brake force by using a friction force with the front housing 1.

Although the output member 9 includes a latch hole formed at the shaft center, and the output shaft 10 forms a latch to be latch-combined with the output member 9 in FIGS. 1 through 3, the output member 9 and the output shaft 10 may be forcibly pressed together into one body.

The wedge bosses 9a are formed at equal intervals on the outer circumferential surface of the output member 9, and the protrusion legs 7b of the clutch drum 7 are inserted between the wedge bosses 9a. Also, on the outer circumferential surface of the output member 9, engager position surfaces 9c into which first and second engager shafts 11a and 11b of the engager member 11 are inserted are formed between every two of the wedge bosses 9a, and are connected by a restrain section surface 9d protruding from the outer circumferential surface of the body of the output member 9 between the engager position surfaces 9c.

The restrain section surface 9d reduces the distance between the front housing 1 and the output member 9 to function as a wedge on the engager member 11, and thus restrains the output member 9 with a strong brake force to prevent the output shaft 10 from rotating.

The output shaft 10 includes the output gear 10a engaging with the sector gear of the link means, an extension shaft 10b of which a front end is inserted into the shaft hole 1a of the front housing 1 and of which a rear end protrudes outside the rear cover 2, and a latch shaft that forms a latch on the extension shaft 10b to be combined with the latch hole of the output member 9.

The output gear 10a engages with the sector gear of the link means to lift or drop the link means when a brake force is released and to restrain motion of the link means when the brake force is generated.

The engager member 11 includes the first and second engager shafts 11a and 11b in pairs, and insert springs 11c disposed between the first and second engager shafts 11a and 11b to push the first and second engager shafts 11a and 11b.

The insert springs 11c surround the wedge bosses 9a of the output member 9 and push the first and second engager shafts 11a and 11b disposed at two sides of insert springs 11c. For this, the insert springs 11c have an "M" shape.

As illustrated in FIGS. 1 through 3, the first and second engager shafts 11a and 11b assembled with the engager position surfaces 9c adjacent to the wedge bosses 9a of the output member 9 and pushed by the insert springs 11c may be motion-restrained by the restrain section surfaces 9d that protrude and connect the engager position surfaces 9c and thus may restrain the rotation of the output member 9.

The engager member 11 includes the first and second engager shafts 11a and 11b and the insert springs 11c in pairs, and includes a total of six pairs formed at intervals of 60°.

Operation of the seat height adjusting apparatus will now be described.

If the stop leg 3b of the lever bracket 3 moves within the guide slot 1d of the front housing 1 when the handle lever is up or down, the input shaft 4 fixed to the shaft hole 3a of the lever bracket 3 also moves to rotate. In this case, the clutch spring 6a that elastically supports the stop leg 3b of the lever bracket 3 is compressed in the same direction as the lever bracket 3.

If the input shaft 4 rotates as described above, the cam surfaces 4a formed on the outer circumferential surface of the input shaft 4 move, and the torque transfer unit 8 contacting the cam surfaces 4a also moves in the same circumferential direction as the input shaft 4. In this case, if the torque transfer unit 8 moves in the same circumferential direction as the input shaft 4, one of the bent portions 5a of the elastic member 5 is pushed by the engager disposed at one end of the torque transfer unit 8 to move in the same direction as the torque transfer unit 8, the other of the bent portions 5a is motion-restrained by the guide hole 6b, and thus the elastic member 5 is elastically compressed.

The clutch drum 7 rotates due to friction-contact between the torque transfer unit 8 and the pressing surface 7a, and thus the brake unit B is unlocked. That is, the clutch drum 7 strongly pushed by the torque transfer unit 8 rotates in the same direction as the input shaft 4 to move the engager member 11 such that the clutch drum 7 is switched to a state capable of rotating the output member 9.

Due to the rotation of the clutch drum 7, the protrusion legs 7b presses the second engager shafts 11b of the engager member 11, which are disposed in a rotation direction, and the pressed second engager shafts 11b compress the insert springs 11c fitted between the wedge bosses 9a.

As such, the second engager shafts 11b move from the restrain section surfaces 9d to the engager position surfaces 9c and thus the friction force between the front housing 1 and the clutch drum 7 is greatly weakened or released.

Here, the clutch drum 7 is rotated in the same direction as the output member 9, and the output member 9 is rotated in the same direction as the output shaft 10 fixed to the output member 9.

After that, due to the rotation of the output shaft 10, the output gear 10a fixed to the output shaft 10 rotates in the same direction as the output shaft 10, the rotation of the output gear 10a is transferred to the sector gear, the link means operates by the sector gear, and thus the height of a seat may be adjusted.

Restoration of the clutch unit A to its initial state will now be described.

If the lever bracket 3 inversely rotates due to an elastic restoration force of the clutch spring 6a that elastically supports the stop leg 3b of the lever bracket 3, the input shaft 4 of which the front end is fixed to the lever bracket 3 also inversely rotates to return to its initial state.

Also, the torque transfer unit 8 returns to its initial state by the bent portions 5a of the elastic member 5, which are elastically moved due to the engager disposed at one end of the torque transfer unit 8.

As described above, if the input shaft 4 inversely rotates due to an elastic restoration force of the clutch spring 6a, and the torque transfer unit 8 returns to its initial state due to an elastic restoration force of the elastic member 5, the clutch drum 7 that friction-contacts the torque transfer unit 8 also inversely rotates to return to its initial position.

Restoration of the brake unit B to its initial state will now be described.

If the torque transfer unit 8 that inversely rotates when the handle lever is manipulated rotates the clutch drum 7 in the same direction as the torque transfer unit 8 due to elastic restoration forces of the clutch spring 6a and the elastic member 5, a rotation torque applied to the clutch drum 7 is released and an wedge operation of the engager member 11 is re-achieved.

That is, if the force of the clutch drum 7 applied to the engager member 11 is released, the second engager shafts 11b receiving an elastic restoration force of the compressed insert spring 11c move from the engager position surfaces 9c to the restrain section surfaces 9d of the output member 9 to return to its initial state.

If the engager member 11 returns to its initial state, the wedge operation is achieved to generate a strong friction force between the front housing 1 and the output member 9, a rotation torque transferred from the link means to the output shaft 10 due to a weight applied to a seat is blocked by the output member 9 that is restrained by the front housing 1 and thus the seat may be fixed at an adjusted height.

According to the above-described apparatus for adjusting the height of a vehicle seat, according to the present invention, since a torque transfer unit including a plurality of engagers is inserted between cam surfaces of an input shaft and an inner circumferential surface of a clutch drum to transfer a rotation torque of the input shaft to the clutch drum, a conventional retainer may be omitted, backlash caused by a retaining clearance and an operation clearance may be prevented, and thus an operational efficiency may be increased.

Also, since a retainer for retaining engagers for power transfer is omitted, the number of components may be reduced to reduce a manufacturing cost and an assembling process may be omitted to reduce a manufacturing time.

Furthermore, since a spring washer that elastically supports the torque transfer unit forward and provides a friction force to an output member is used, an inversely input torque applied to the output member may be weakened and thus conventional problems of a reduction in operational efficiency and generation of noise may be solved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for adjusting a height of a vehicle seat, the apparatus comprising:
   an input shaft for inputting a torque by using a lever installed at one side of the seat;
   an output member connected to a link means to output the torque for adjusting the height of the seat;
   a clutch drum interposed between the input shaft and the output member on a torque transfer path;
   a torque transfer unit comprising a plurality of neighboring engagers wherein two engagers disposed at two ends of the neighboring engagers are spaced apart from each other, and wedge-combined between the input shaft and the clutch drum to transfer the torque; and
   an elastic member for providing an elastic restoration force for moving the torque transfer unit to its initial position,
   wherein the elastic member comprises a pair of bent portions extending and bent from two ends of the elastic member toward the output member, and wherein the bent portions are in direct contact with and elastically support the two engagers disposed at the two ends of the neighboring engagers.

2. The apparatus of claim 1, wherein the clutch drum and the input shaft rotate about the same central axis, wherein a plurality of cam surfaces are formed in a concave-curved or flat shape on at least one of an outer circumferential surface of the input shaft and an inner circumferential surface of the clutch drum, and
   wherein the torque transfer unit is wedge-combined between the outer circumferential surface of the input shaft and the inner circumferential surface of the clutch drum to transfer the torque of the input shaft to the clutch drum.

3. The apparatus of claim 1, further comprising a spring stopper member comprising an inner circumferential surface into and by which the elastic member is inserted and supported,
   wherein the bent portions of the elastic member are inserted into and motion-restricted by a guide hole formed in the inner circumferential surface of the spring stopper member.

4. The apparatus of claim 3, wherein, if the torque transfer unit moves in one circumferential direction in association with rotation of the input shaft, one of the bent portions is pushed by the engager disposed at one end of the torque transfer unit to move in the same direction as the torque transfer unit, and the other of the bent portions is restrained by the guide hole and thus does not move.

5. The apparatus of claim 3, further comprising:
   a lever bracket to and with which one end of the input shaft is fixed and combined, and which comprises a stop leg protruding and extending in a shaft direction; and
   a clutch spring for elastically supporting the stop leg to provide an elastic restoration force for restoring the lever bracket into its initial position, and accommodated in the inner circumferential surface of the spring stopper member.

6. The apparatus of claim 5, further comprising:
   a front housing comprising an internal space; and
   a guide slot formed in an outer circumference of the front housing to restrict a rotation angle of the lever bracket such that the stop leg of the lever bracket passes through the guide slot.

7. The apparatus of claim 1, further comprising a spring washer inserted between a front surface of the output member and the torque transfer unit to elastically support the torque transfer unit and to provide a friction force to the output member.

8. The apparatus of claim 7, wherein the spring washer is bent in a shaft direction to elastically support the output member.

9. The apparatus of claim 1, further comprising a spring washer inserted between a rear surface of the output member and a rear cover to provide a friction force to the output member.

10. The apparatus of claim 1, further comprising a plurality of protrusion legs protruding and extending from an outer circumferential surface of the clutch drum in a shaft direction to transfer the torque transferred from input shaft to the output member.

11. The apparatus of claim 1, wherein the engagers are formed in a ball or roller shape.

* * * * *